United States Patent [19]
Sandorfi

[11] Patent Number: 5,655,153
[45] Date of Patent: Aug. 5, 1997

[54] BUFFER SYSTEM

[75] Inventor: Miklos A. Sandorfi, Foxboro, Mass.

[73] Assignee: EMC Corporation, Hopkinton, Mass.

[21] Appl. No.: 554,739

[22] Filed: Nov. 7, 1995

[51] Int. Cl.⁶ .................................................. G06F 13/00
[52] U.S. Cl. ...................... 395/858; 364/DIG. 1; 395/427; 395/431; 395/841; 395/853; 395/876; 395/882; 395/886; 395/891
[58] Field of Search .................................... 395/427, 841, 395/853, 858, 876, 882, 886, 891, 431

[56] References Cited

U.S. PATENT DOCUMENTS

| | | | |
|---|---|---|---|
| 5,058,051 | 10/1991 | Brooks | 395/494 |
| 5,148,537 | 9/1992 | Belsan | 395/458 |
| 5,337,409 | 8/1994 | Sakata | 395/162 |

Primary Examiner—Frank J. Asta
Attorney, Agent, or Firm—Fish & Richardson P.C.

[57] ABSTRACT

A buffer having a predetermined number, M, of input ports adapted for connection to one of a plurality of devices. The devices have different numbers, P, of ports, where P is less than, or equal to, M. The buffer includes a processor for determining the number of ports, P, of the one of the plurality of devices connected to the M ports of the buffer. The buffer couples the P ports of the device to M output ports of the buffer in a ratio of [M/P] sequences. A method for determining the number, P, of transmit/receive ports of one of a plurality of devices. After connecting one of the plurality of devices to the buffer, a predetermined pattern of data is placed on each of the output ports when the connected device is in a loopback mode. The pattern of data is detected at the input ports in response to the predetermined data placed on the output ports. The predetermined pattern on the output ports is compared with the detected pattern to determine the number of ports, P, of the connected one of the devices.

10 Claims, 13 Drawing Sheets

BUFFER SYSTEM

BACKGROUND OF THE INVENTION

This invention relates generally to a buffer system and more particularly to a system for use with serial data/parallel data converters. Still more particularly, the invention relates to a system for use with serial data/parallel data converters adapted for use in Fibre Channel systems.

As is known in the art, serial data/parallel data converters have a wide variety of applications. One such application is with Fibre Channel systems. For example, in one arrangement, data passes between a central processing system and a bank of magnetic data storage disks through the Fibre Channel system. More particularly, the bank of magnetic storage disks is coupled to central processing units through an interface. The interface includes CPU, or "front end", controllers and "back end" disk controllers. The interface may also include, in addition to the controllers, a semiconductor temporary memory storage or cache, as described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

While data passes serially to, and from, the interface via the Fibre Channels; data passes in parallel through the interface itself. Therefore, the "front end" and "back end" controllers must include a serial data/parallel data converter to convert the serial data fed to the controller by the Fibre Channel into parallel, multi-bit data, on the one hand, and to convert the parallel data produced by the controller into single bit, serial data for the Fibre Channel. One such serial data/parallel data converter is sometimes referred to as a gigabit link module (GLM). These GLM's are available in full, 1.062 gigabit per second Fibre Channel speed; half speed and, quarter speed modules, as well as in 10 bit, 20 bit and 40 bit data widths. For each speed/data width configuration, however, a different controller configuration is required.

SUMMARY OF THE INVENTION

In accordance with the present invention, a buffer is provided having a predetermined number, M, of input ports adapted for connection to one of a plurality of devices. The devices have different numbers, P, of ports, where P is less than, or equal to, M. The buffer includes a processor for determining the number of ports, P, of the one of the plurality of devices connected to the M ports of the buffer. The buffer couples the P ports of the device to M output ports of the buffer in a ratio of [M/P] sequences.

In accordance with another feature of the invention, a buffer is provided having a predetermined number, M, of ports adapted for connection to one of a plurality of devices. The devices have different numbers, P, of ports, where P is in a range from a minimum number of N ports to a maximum number of M ports. Circuitry is provided for determining the number of ports, P, of the one of the plurality of devices connected to the M ports of the buffer. The buffer has a ratio of [M/N] storage buffers. The circuitry couples the P ports of the one of the plurality of devices connected to the M ports of the buffer to the storage buffers in a ratio of [M/P] sequences, the P ports being coupled to a different one of the [M/N] storage buffers in each one the [M/P] sequences.

In accordance with still another feature of the invention, a method is provided for determining the number, P, of transmit/receive ports of one of a plurality of devices. The devices have different numbers of transmit ports and receive ports. Each one of the devices is adapted for connection to a buffer. The buffer has a predetermined number, M, of input ports and output ports, where P is equal to or less than M. The receive ports of the device are adapted for connection to the output ports of the buffer and the transmit ports of the device are adapted for connection to the input ports of the buffer. Each one of such devices is adapted to couple the transmit ports to the receive ports thereof when such device is placed in a loopback mode. After connecting one of the plurality of devices to the buffer, a predetermined pattern of data is placed on each of the output ports when the connected device is in the loopback mode. The pattern of data is detected at the input ports in response to the predetermined data placed on the output ports. The predetermined pattern on the output ports is compared with the detected pattern to determine the number of ports, P, of the connected one of the devices.

DESCRIPTION OF THE PREFERRED EMBODIMENTS

Figure 1:
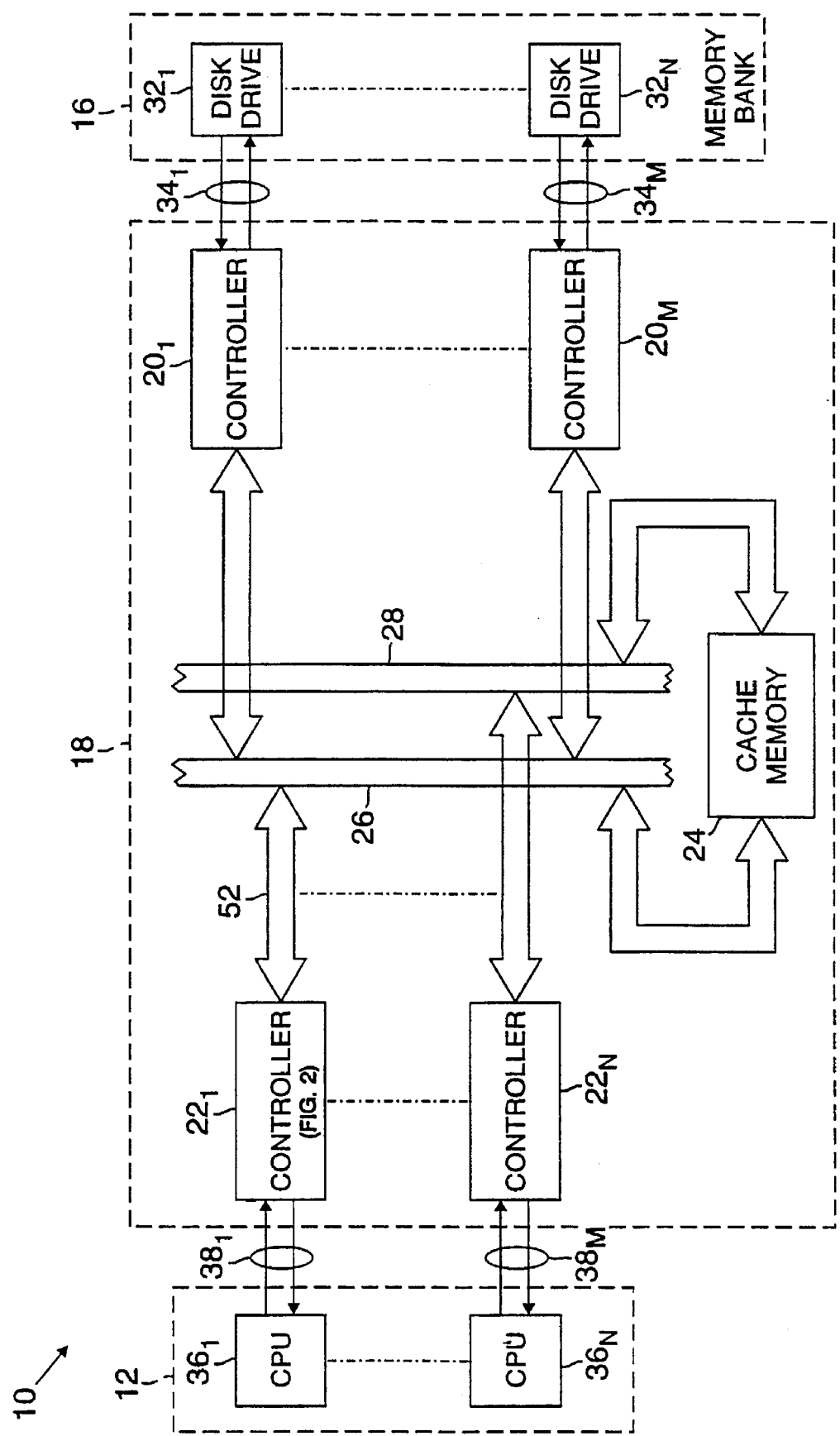
FIG. 1 is a block diagram of a computer system having a data storage system coupled thereto through an interface according to the invention.

Referring now to FIG. 1, a computer system 10 is shown. The computer system 10 includes a main frame computer section 12 for processing data. Portions of the processed data are stored in, and retrieved from, a bank 16 of magnetic storage disk drives $32_1$–$32_n$ through a system interface 18. The system interface 18 includes disk controllers $20_1$–$20_m$, central processor unit (CPU) controllers $22_1$–$22_n$ and cache memories 24 electrically interconnected, in a conventional manner, as shown, through a pair of buses 26, 28 provided for redundancy, as described in the above referenced patent application. Each one of the disk controllers $20_1$–$20_m$ is coupled to a corresponding set of the disk drives $32_1$–$32_n$, rspectively, as shown, through Fibre Channels $34_1$–$34_m$, respectively, as shown. Likewise, each one of the CPU controllers $22_1$–$22_n$ is coupled to a corresponding CPU $36_1$, $36_n$, respectively, as shown, through Fibre Channel protocol channels $38_1$–$38_m$, respectively, as shown.

Figure 2:
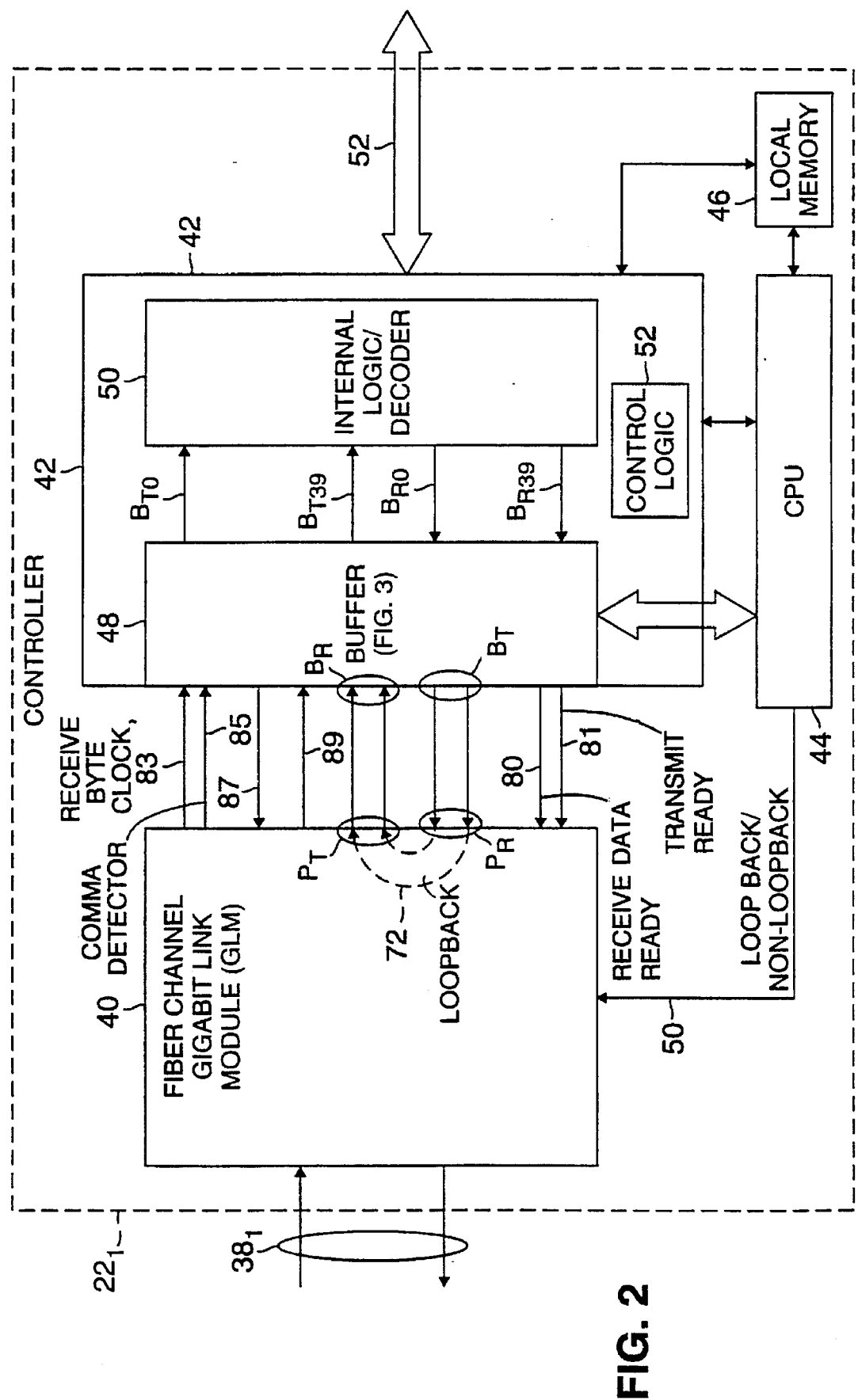
FIG. 2 is a block diagram of an exemplary controller used in the interface of FIG. 1.

An exemplary one of the controllers $20_1$–$20_m$, $22_1$–$22_n$, here controller $22_1$ is shown in FIG. 2 to include a Fibre Channel gigabit link module (LM) 40, an application specific integrated circuit (ASIC) 42, a central processing unit 44, and a local memory 46, arranged as shown. The ASIC 42 includes an buffer 48, to be described in detail in connection with FIG. 3, internal logic/decoders 50, and control logic 52. The serial data is fed to, and retrieved from, the controller $22_1$, via Fibre Channel $38_1$, as mentioned above, and parallel data is fed to, and retrieved from, controller $22_1$ via bus 52, as shown.

Figure 3:
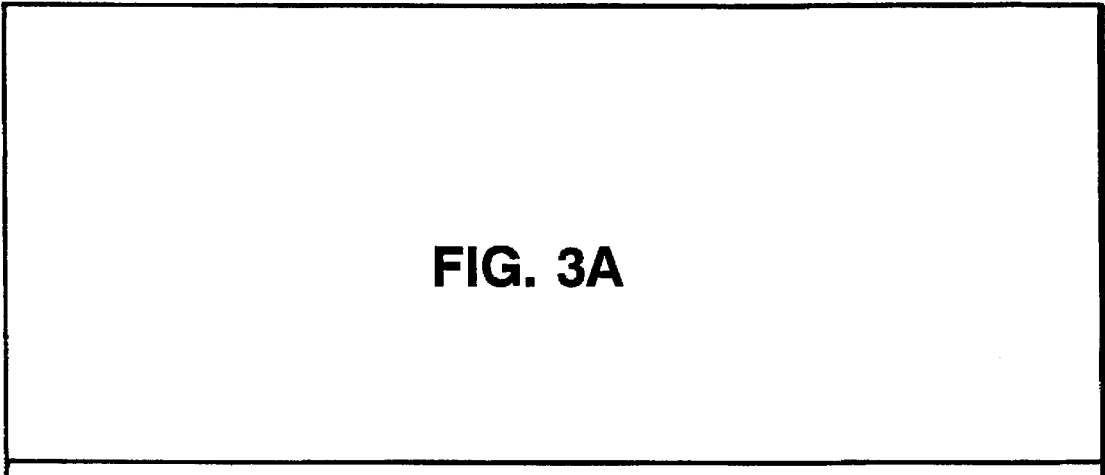
FIG. 3 shows the relationship between FIGS. 3A and 3B which together is a block diagram of a buffer according to the invention, such buffer being used in the controller of FIG. 2.
Figure 3:
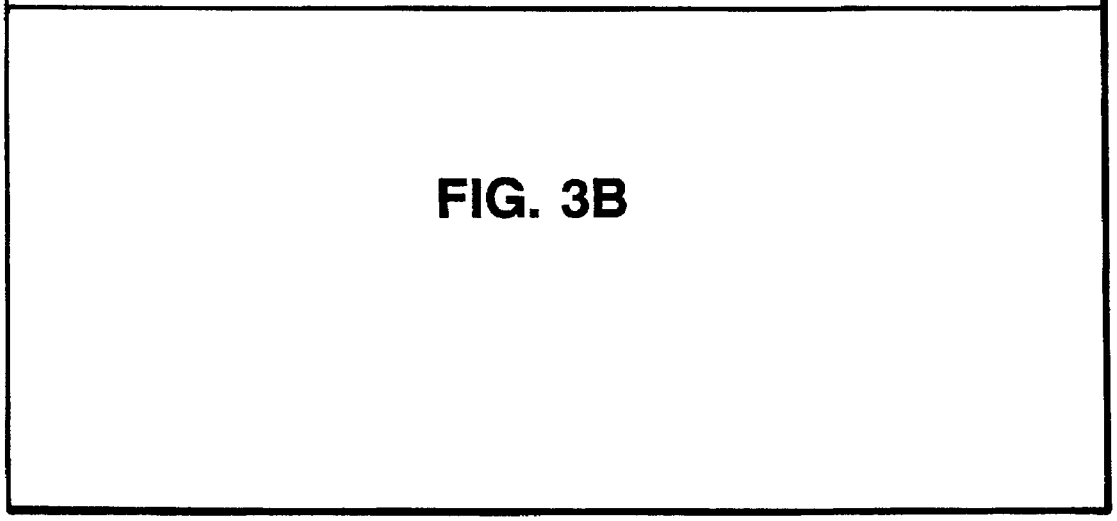
Figure 3A:
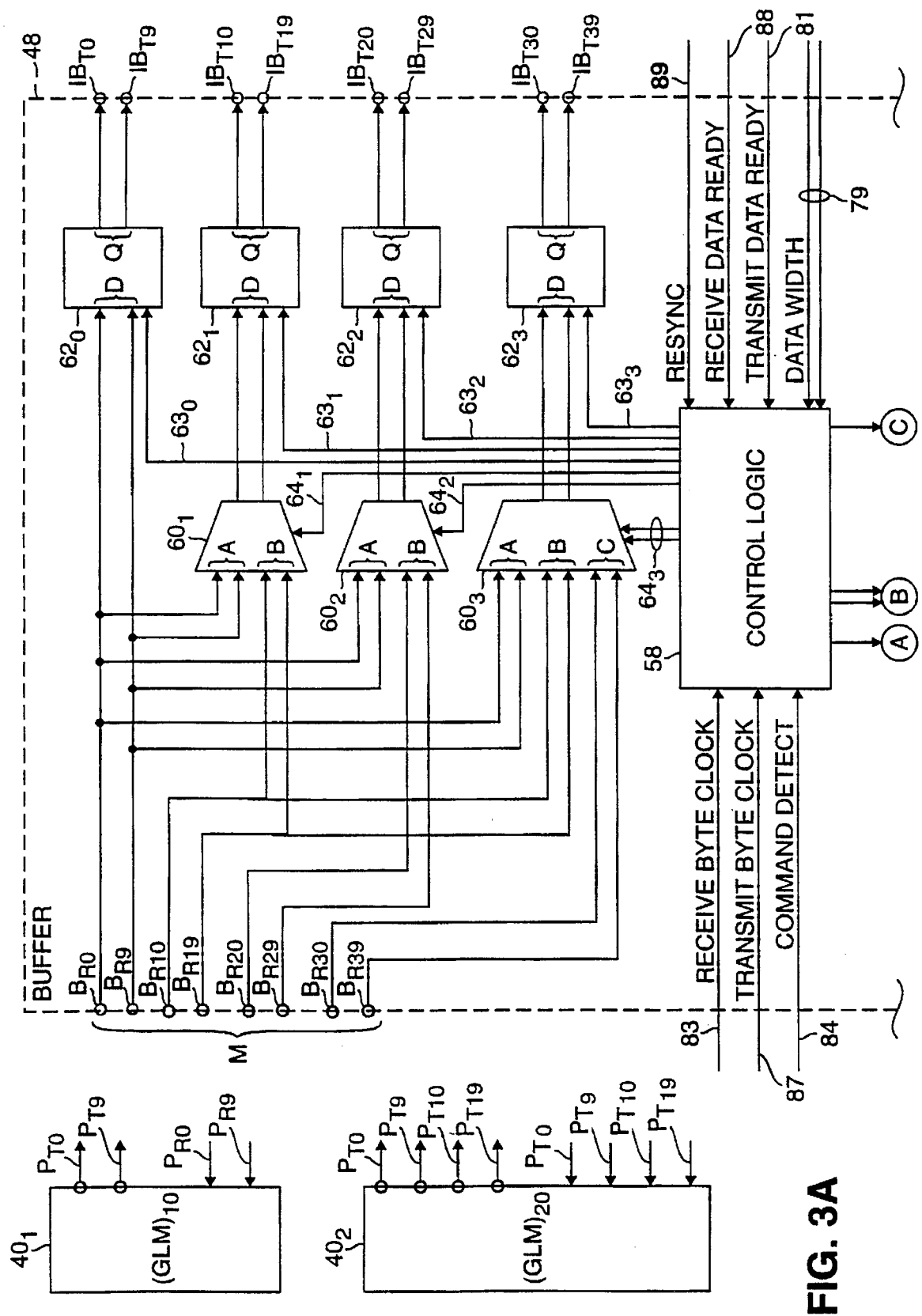
Figure 3B:
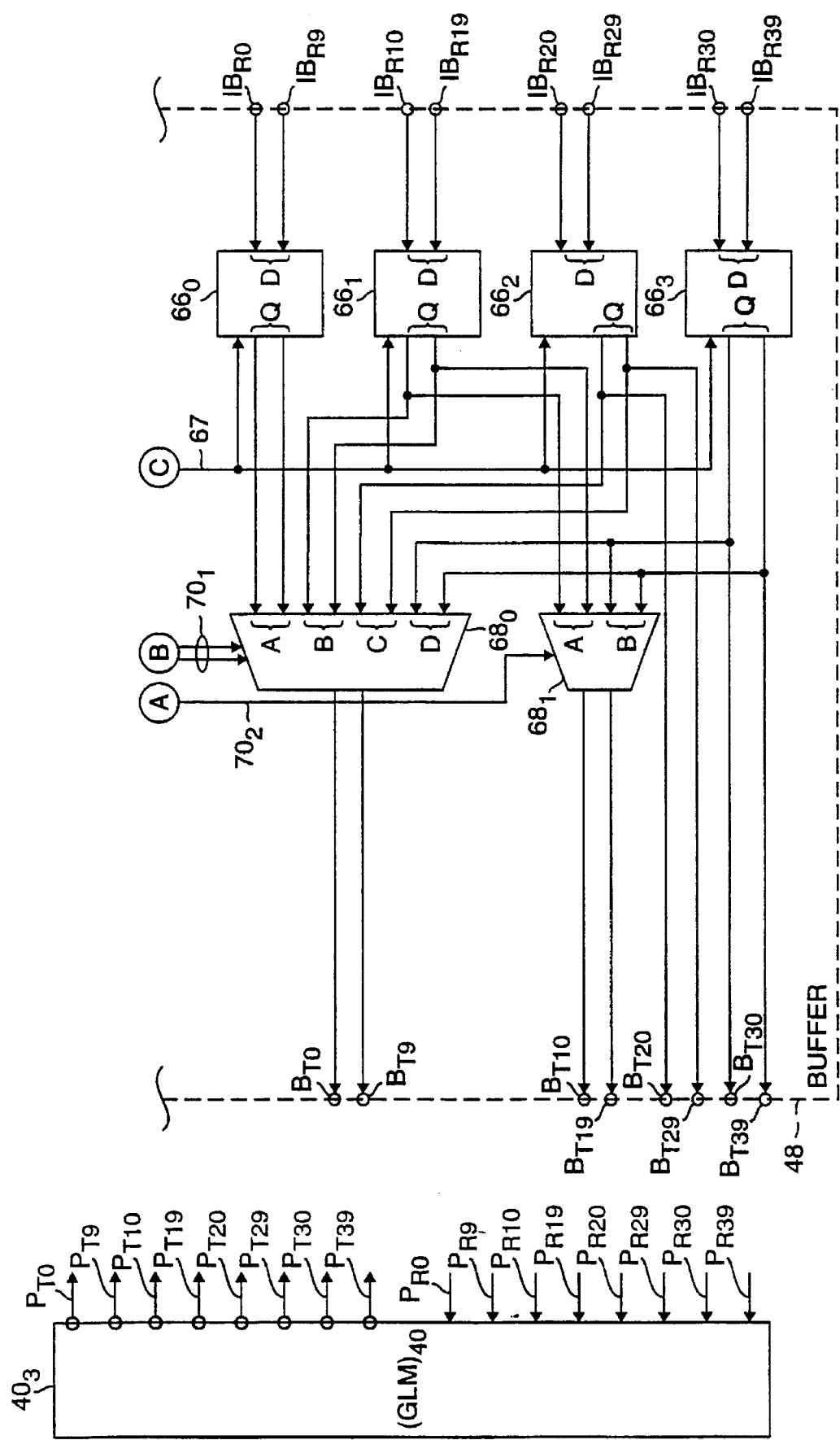

The controller $22_1$ is adapted to operate with GLM's 40 having any one of a plurality of speed/data width configurations, while the ASIC 42 operates with a redetermined number of ports (i.e., predetermined data width) and with a predetermined speed regardless of the port/speed configuration of the GLM connected to it. Thus, each GLM 40 converts the serial data fed thereto from Fibre Channel $38_1$ to parallel data on transmit ports $P_T$. Likewise, each GLM 40 converts parallel data on receive ports $P_R$ into serial data for Fibre Channel $38_1$. Each GLM 40 may have: 10 transmit ports, $P_T$, and 10 receive ports, $P_R$ (i.e., 10 bit data width GLM 40); 20 transmit ports, $P_T$, and 20 receive ports, $P_R$ (i.e., a 20 bit data width GLM 40); or, 40 transmit ports, $P_T$, and 40 receive ports, $P_R$, (i.e. a 40 bit data width GLM 40), for example. Thus, each GLM 40 has P transmit ports, $P_T$, and P receive ports, $P_R$ where P is the number of bits in the data width and is an integer, here either: 10, 20 or 40. Further, GLM 40 may operate at 1.062 gigabits per second; 0.531 gigabit per second; or, 0.2655 gigabit per second, respectively, for example. In each case, however, buffer 48 converts data on GLM 40 transmit ports, $P_T$, into parallel data at the predetermined number of buffer transmit ports $B_T$, here M ports, where M is the largest number of transmit ports $P_T$ expected for the plurality of GLM's 40 expected to be used with the ASIC 42. Thus, here M is 40. Further, the buffer 48 transmit ports $B_T$ are $B_{T0}$–$B_{T39}$, as indicated in FIGS. 3, 3A and 3B. Likewise, buffer 48 converts parallel data on the predetermined number of buffer receive ports $B_{R0}$–$B_{R39}$, here M ports, into parallel data at the GLM 40 receive ports $P_R$.

Referring now to FIGS. 3, 3A and 3B, buffer 48 is shown adapted for connection to either GLM $40_1$, GLM $40_2$ or GLM $40_3$. GLM $40_1$ is a 10 bit data width GLM and has 10 transmit ports $P_{T0}$–$P_{T9}$ and 10 receive ports $P_{R0}$–$P_{R9}$, as shown. GLM $40_2$ is a 20 bit data width GLM and has 20 transmit ports $P_{T0}$–$P_{T19}$ and 20 receive ports $P_{R0}$–$P_{R19}$, as shown. GLM $40_3$ is a 40 bit data width GLM and has 40 transmit ports $P_{T0}$–$P_{T39}$ and 40 receive ports $P_{R0}$–$P_{R39}$, as shown. Thus, when GLM $40_1$ is used GLM transmit ports $P_{T0}$–$P_{T9}$ connect with buffer receive ports $B_{R0}$–$B_{R9}$, respectively, and GLM receive ports $P_{R0}$–$P_{R9}$ connect with buffer transmit ports $B_{T0}$–$B_{T9}$, respectively. When GLM $40_2$ is used transmit ports $P_{T0}$–$P_{T19}$ connect with buffer receive ports $B_{R0}$–$B_{R19}$, respectively, and GLM receive ports $P_{R0}$–$P_{R19}$ connect with transmit ports $B_{T0}$–$BT_{19}$, respectively. When GLM $40_3$ is used transmit ports $P_{T0}$–$P_{T39}$ connect with receive ports $B_{R0}$–$B_{R39}$, respectively, and receive ports $P_{R0}$–$P_{R39}$ connect with transmit ports $B_{T0}$–$B_{T39}$, respectively.

Buffer 48 includes: selectors $60_1$, $60_2$, $60_3$; and, D flip flop sections $62_0$, $62_1$, $62_2$, and $62_3$. The D flip flop sections $62_0$, $62_1$, $62_2$, and $62_3$ are storage buffers and are clocked by clock pulses on line $63_0$, $63_1$, $63_2$ and $63_3$, respectively.

Selector $60_1$ has two sets of input ports A, B, as indicated, and a set of output ports connected to the D inputs of a D flip flop section $62_1$, as indicated. One of the sets of input ports A or B is coupled to the output ports thereof selectively in accordance with a binary control signal on line $64_1$. Selector $60_2$ has two sets of input ports A, B, as indicated and a set of output ports connected to the D inputs of a D flip flop section $62_2$, as indicated. One of the sets of input ports A or B is coupled to the output ports thereof selectively in accordance with a binary control signal on line $64_2$. Selector $60_3$ has three sets of input ports A, B, and C, as indicated, and a set of output ports connected to the D inputs of a D flip flop section $62_3$, as indicated. One of the sets of input ports A, B or C is coupled to the output ports thereof selectively in accordance with a pair of binary control signals on lines $64_2$. Buffer receive ports $B_{R0}$–$B_{R9}$ are connected to: the D input of a D flip flop section $62_0$; and, the A input ports of selectors $62_1$, $62_2$ and $62_3$, as indicated. Buffer receive ports $B_{R9}$–$B_{R19}$ are connected to the B input ports of selectors $60_2$ and $60_3$, as indicated. Ports $B_{R20}$–$B_{R29}$ are connected to the B input ports of selector $60_2$, as indicated. Ports $B_{R20}$–$B_{R29}$ are connected to the C input ports of selector $60_3$, as indicated. The Q outputs of the D flip flops $62_0$, $62_1$, $62_2$, $62_3$ are coupled to buffer internal bus transmit ports $IB_{T0}$–$IB_{T9}$, $IB_{T10}$–$IB_{T19}$, $IB_{T20}$–$IB_{T29}$, $IB_{T30}$–$IB_{T39}$, respectively, as indicated.

Buffer 48 also includes, in addition to a control logic section 58, D flip flop sections $66_0$, $66_1$, $66_2$, and $66_3$ and selectors $68_0$ and $68_1$. The D flip flop sections $66_0$, $66_1$, $66_2$, and $66_3$ are storage buffers and are fed by clock signals on line 67. Buffer internal bus receive ports $IB_{R0}$–$IB_{R9}$ are connected to the D inputs of flip flop section $66_0$, as shown. Buffer internal bus receive ports $IB_{R10}$–$IB_{R19}$ are connected to the D inputs of flip flop section $66_1$, as shown. Buffer internal bus receive ports $IB_{R20}$–$IB_{R29}$ are connected to the D inputs of flip flop section $66_2$, as shown. Buffer internal bus receive ports $B_{R30}$–$B_{R39}$ are connected to the D inputs of flip flop section $66_3$, as shown. Selector $68_0$ has four sets of input ports A, B, C, and D, as indicated, and a set of output ports connected to ports $B_{T0}$–$B_{T09}$, as indicated. One of the sets of input ports A, B, C or D coupled to the output ports thereof selectively in accordance with a pair of binary control signals on lines $70_1$. Selector $68_1$ has two sets of input ports A, B, as indicated, and a set of output ports connected to ports $B_{T10}$–$BT_{19}$, as indicated. One of the sets of input ports A or B coupled to the output ports thereof selectively in accordance with a binary control signal on line $68_1$. The Q outputs of flip flop $66_0$ are connected to the set of A input ports of selector $68_0$, as indicated. The Q outputs of flip flop $66_1$ are connected to the set of B input ports of selector $68_0$ and the set of A inputs of selector $68_1$, as indicated. The Q outputs of flip flop $66_2$ are connected to the set C input ports of selector $68_0$ and ports $B_{T20}$–$BT_{29}$, as indicated. The Q outputs of flip flop $66_3$ are connected to ports $B_{T30}$–$B_{T39}$, as indicated.

Figure 4A:
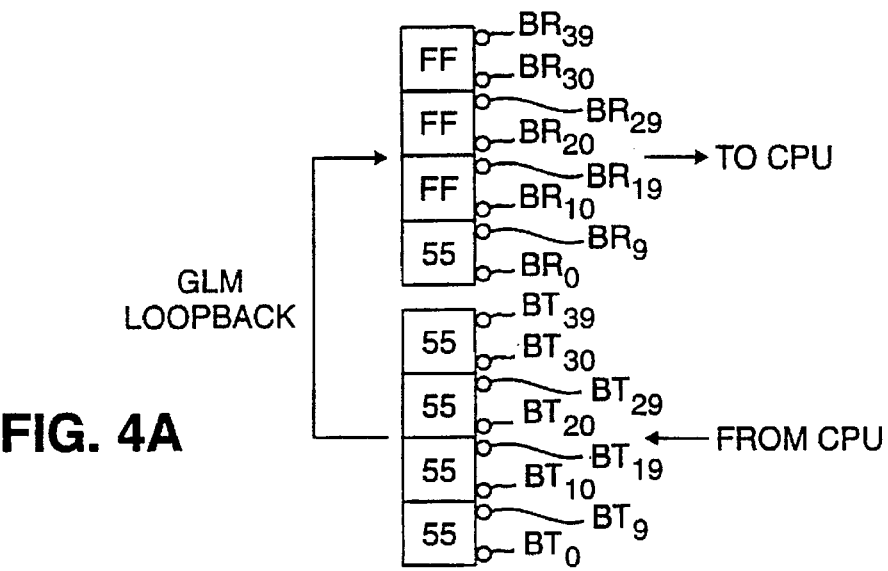
FIGS. 4A, 4B, and 4C are diagrams showing GLM's having different speed/data width configurations in an internal loopback mode used to determine the data width configuration of the GLM connected to the buffer of FIG. 3, FIG. 4A showing a 10 bit data width GLM, FIG. 4B showing a 20 bit data width GLM, and FIG. 4C showing a 40 bit data width configuration.
Figure 4B:
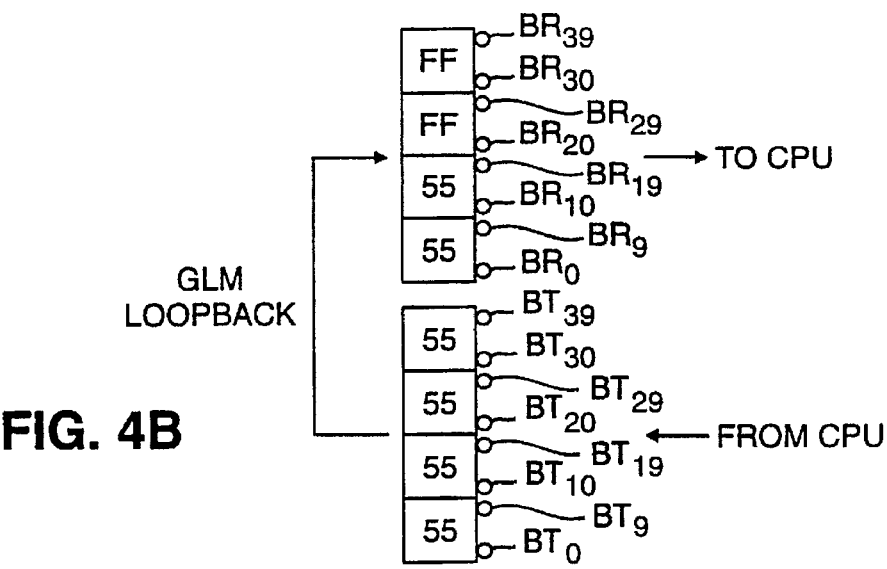
Figure 4C:
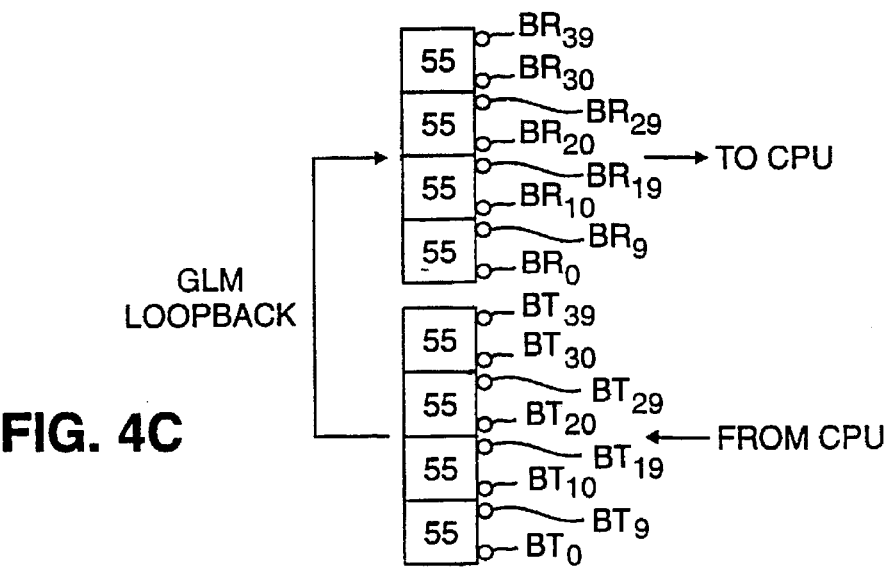
Figure 5:
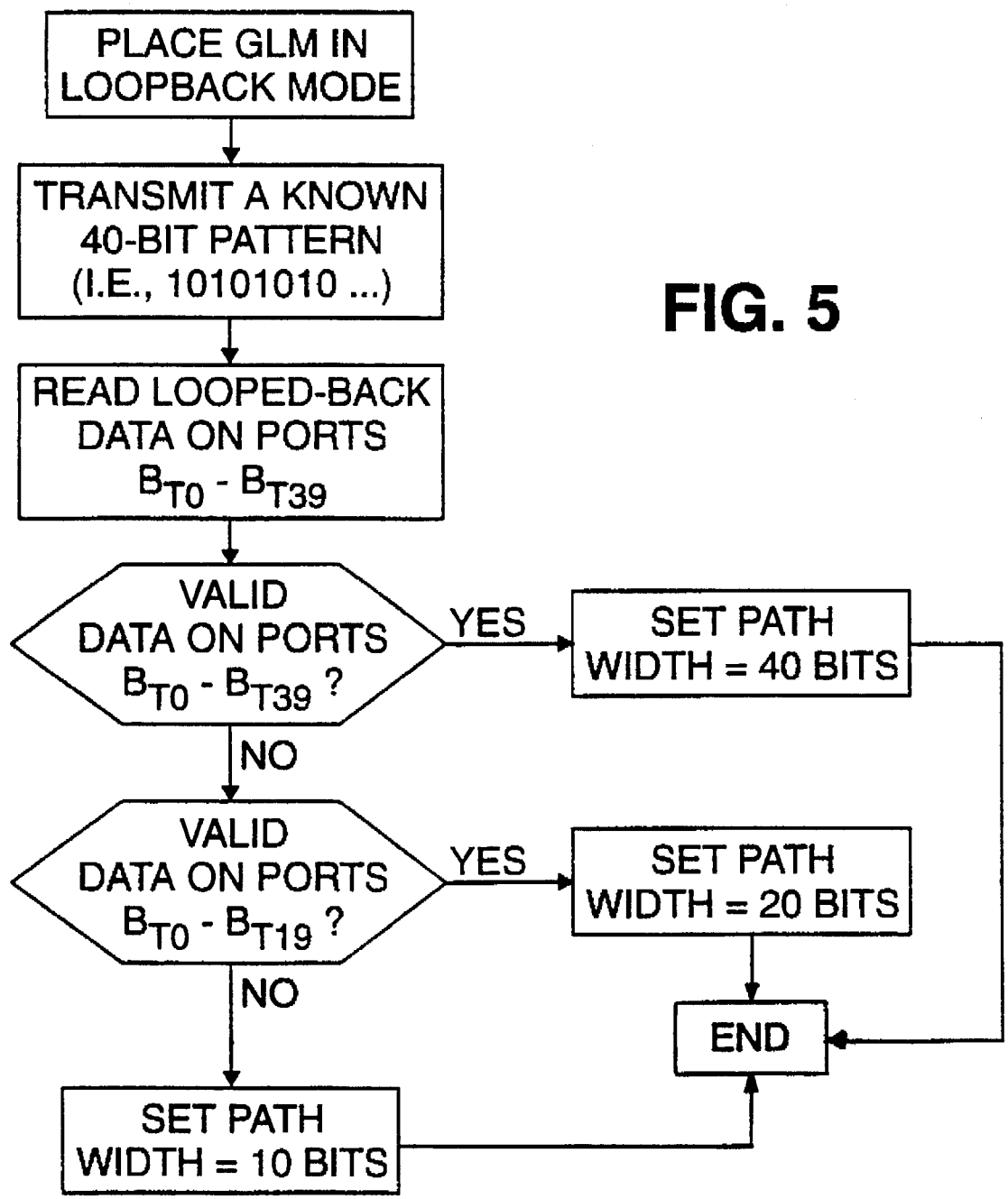
FIG. 5 is a flow diagram showing the steps used to determine the GLM speed/data width configuration of the GLM connected to the buffer of FIG. 3.

Central processor 44 (FIG. 1) first determines which one of the GLM $40_1$, $40_2$ or $40_3$ is connected to the buffer ports $B_{R0}$–$B_{R39}$ and $B_{T0}$–$B_{T39}$. More specifically, central processor 44 determines the number, P, of transmit ports and receive ports which are connected to buffer 48 (i.e., the data width of the GLM 40 connected to buffer 48). The process is summarized in FIG. 5. After the GLM $40_1$, $40_2$ or $40_3$ is connected to buffer 48, the connected GLM 40 is placed in an internal loopback mode by a control signal on line 70 from the central processor 44. In the loopback mode, data fed by the central processor 44 to buffer 48 passes into receive ports $P_R$ of the GLM connected to the buffer 48 and then passes directly to the transmit ports $P_T$ of the GLM 40, as indicated by the phantom bus 72. Next, the CPU 44 writes a unique, predetermined pattern, such as 55 hex onto transmit ports $B_{T0}$–$B_{T39}$. If a 10 transmit/10 receive port GLM, i.e., a 10 bit data width GLM $40_1$ is connected to the buffer 48, the predetermined pattern will appear only at ports $B_{R0}$–$B_{R9}$ (i.e. ports $B_{R10}$–$B_{R39}$ indicating no connection by FF hex); as indicated in FIG. 4A. If, on the other hand, a 20 transmit 20 receive port GLM, i.e., a 20 bit data width GLM $40_2$ is connected to the buffer 48, the predetermined pattern will appear only at ports $B_{R0}$–$B_{R9}$ and ports $B_{R10}$–$B_{R19}$; as indicated in FIG. 4B. Finally, if on the other hand, a 40 transmit/40 receive port GLM, i.e., a 40 bit data width GLM $40_3$ is connected to the buffer 48, the predetermined pattern will appear at ports $B_{R0}$–$B_{R39}$. The process is summarized in the flow diagram of FIG. 5.

Figure 7A:
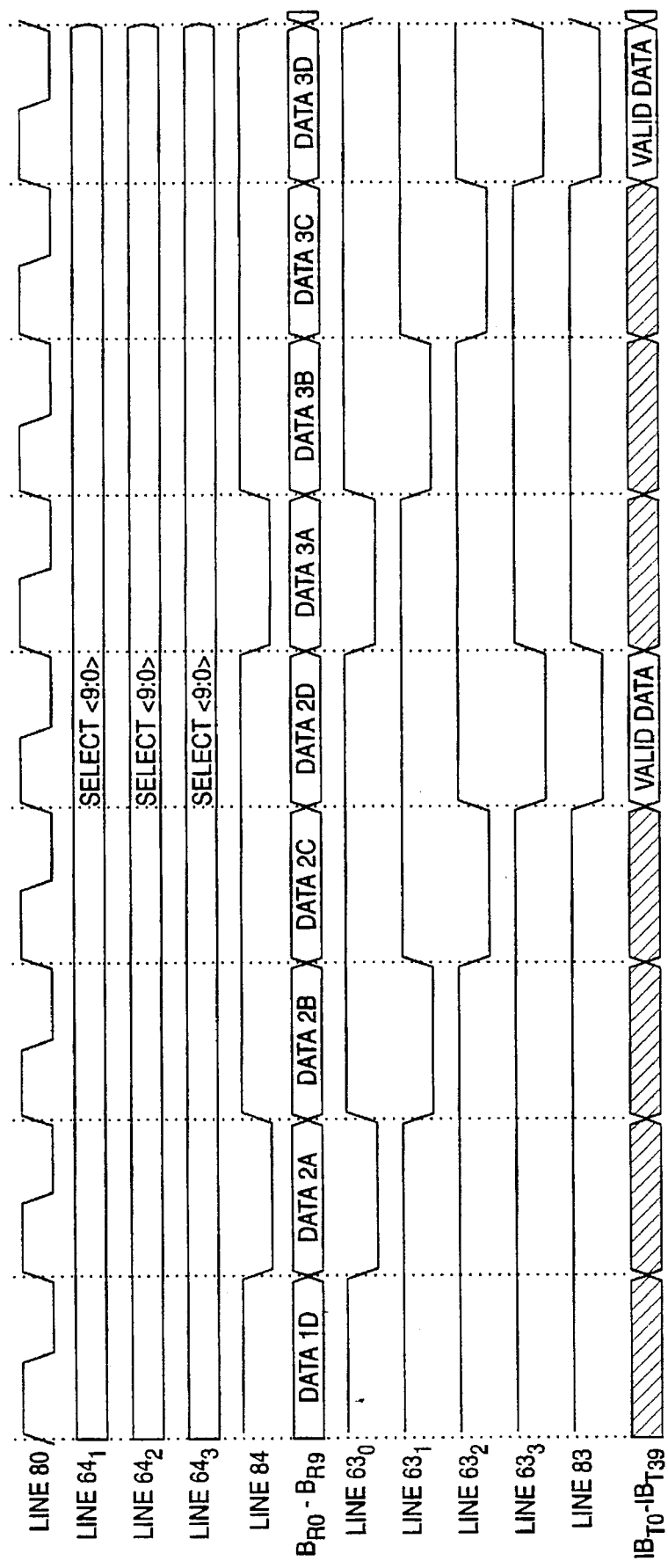
FIGS. 7A–7C are timing diagrams useful in understanding the receive mode of the GLM, FIG. 7A being for a 10 bit data width GLM, FIG. 7B being for a 20 bit data width GLM, and FIG. 7C being for a 20 bit data width GLM.
Figure 7B:
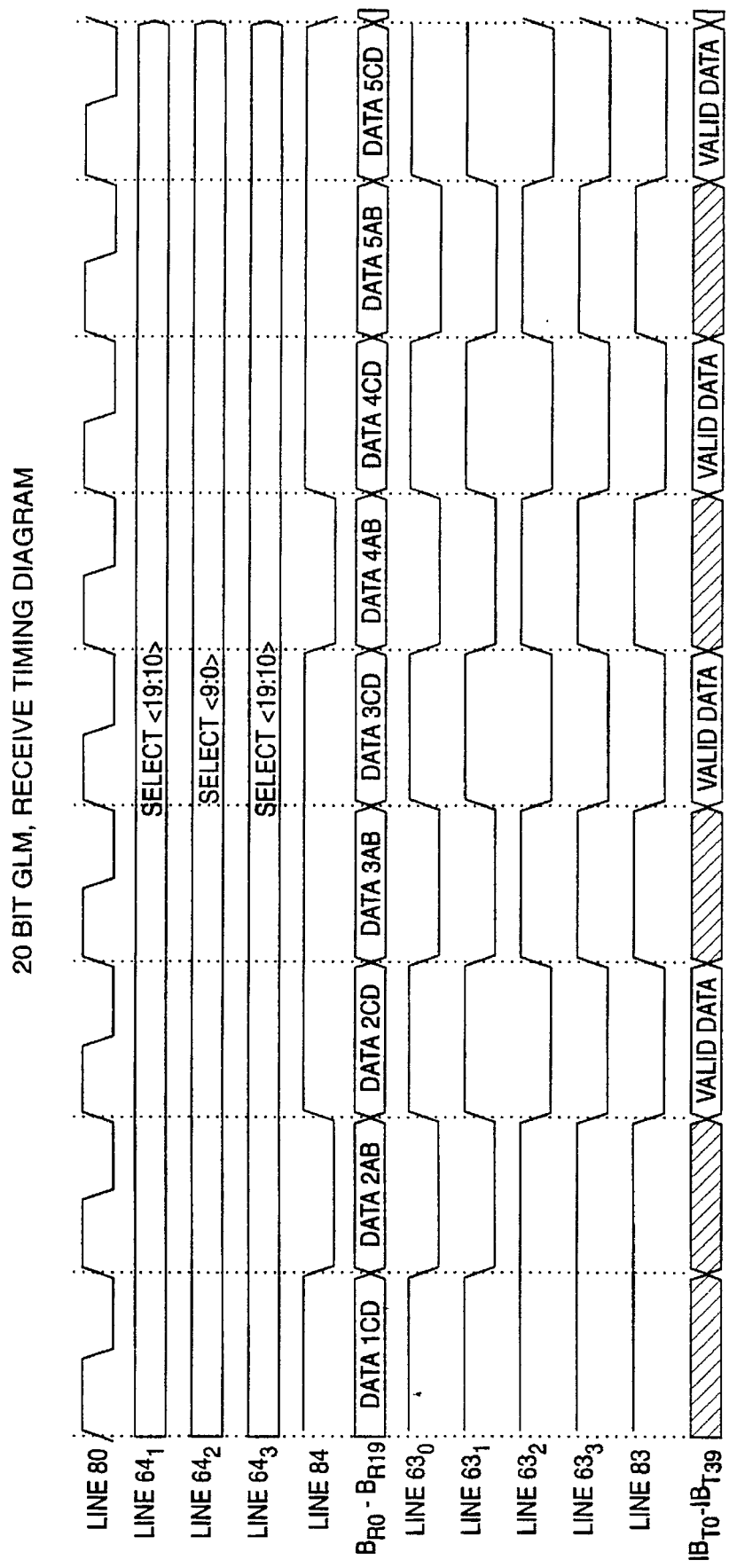
Figure 7C:
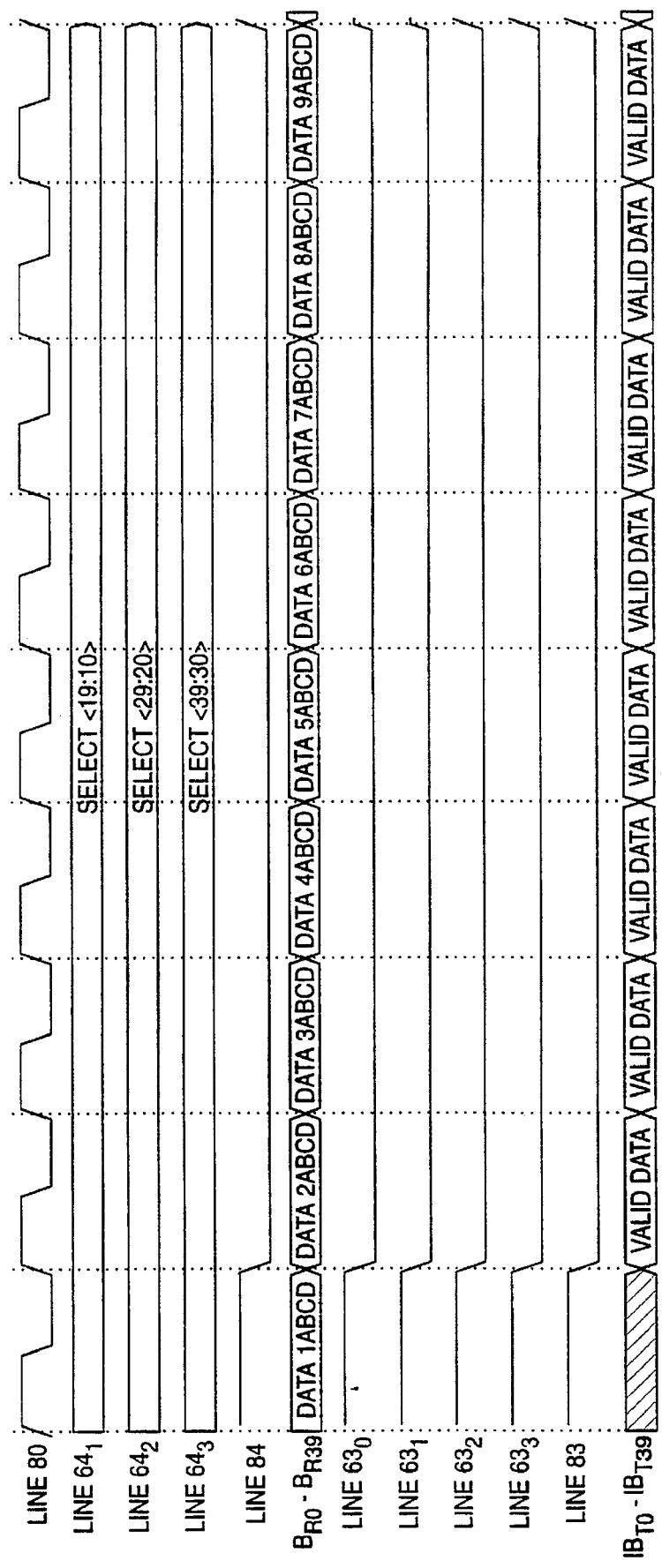

Once the GLM configuration (i.e., 10 bit data width GLM $40_1$, a 20 bit data width GLM $40_2$, a 40 bit GLM $40_3$) has been determined as described above, a data width signal is fed by the CPU 44 to control logic 58 on bus 79. In response to the data word signal on bus 79, the CPU 44 establishes the sequence of control signals on lines $64_1$, $64_2$, $64_3$, $70_1$ and $70_2$ for the selectors $60_1$, $60_2$, $60_3$, $68_0$ and $68_1$, respectively. For example, if GLM $40_1$ is detected (i.e., a 10 bit data width GLM having 10 transmit ports $P_T$ and 10 receive ports $P_R$), during a first of four clock cycles (on line $63_0$, FIG. 7A), the data at ports $P_{T0}$–$P_{T9}$ are stored in parallel into flip-flop section $62_0$. During the second of the fourth clock cycle (on line $63_1$) the data at ports $P_{T0}$–$P_{T9}$, which are also fed to the A input set of selector $60_1$, pass through such selector $60_1$ in response to a control signal fed thereto on line $64_1$ and are stored in parallel in flip-flop section $62_1$. During the third of the fourth clock cycles (on line $63_2$), the data at ports $P_{T0}$–$P_{T9}$, which are also fed to the A input set of selector $60_2$, pass through such selector $60_1$ in response to a control signal fed thereto on line $64_2$ and are stored in parallel in flip-flop section $62_2$. During the fourth of the fourth clock cycles on line ($63_3$), the data at ports $P_{T0}$–PT9, which are also fed to the A input set of selector $60_3$, pass through such selector $60_3$ in response to a control signal fed thereto on lines $64_3$ and are stored in parallel in flip-flop section $62_3$. Thus, at the end of the fourth of each set of four clock cycles, a forty bit digital word is available at ports $B_{T0}$–$B_{T39}$ and a valid data signal is produced on receive data ready line 80. A receive byte clock signal is produced on line 83 to indicate that the receive data is valid. Thus, a receive byte clock signal is produced on line 83 after every 10 bits for a 10 bit data width GLM, once every 20 bits for a 20 bit data width GLM, and once every 40 bits for a 40 bit data width GLM. Further, the GLM will provide a comma detect signal on line 85 to indicate that the special K 28.5 character associated with Fibre channel has been received once every 4th 10 bit data word for a 10 bit data width GLM, once every other 20 bit data word for a 20 bit data width GLM, and once every 40 bit data word for a forty bit data width GLM. It is noted that the buffer 48 couples the P=10 ports, $P_{T0}$–PT9 of the GLM to the M=40 ports, $IB_{T0}$–$IB_{T39}$, of the buffer 48 in a ratio of [M/P]=4 sequences. The timing diagrams for the 10, 20, and 40 bit data GLMs during the receive mode are shown in FIGS. 7A, 7B and 7C, respectively.

Thus, the buffer 48 provides two synchronization signals; receive data ready, on line 80, and transmit data ready, on line 81. When the transmit ready signal is asserted, the ASIC 42 must assert data to the inputs of buffer 48 at $IB_{R0}$–$IB_{R39}$, which will in turn be driven to the GLM on lines $B_{T0}$–$B_{T39}$. These two synchronization signals enable decoupling the GLM speed from the internal operating speed of the ASIC 42. That is, the receive data ready and transmit ready signals provide control to a buffer, or "First In/First Out" (FIFO), not shown, in the ASIC 42, which in turn provides independence between the ASIC 42 operating frequency and the GLM operating frequency. Two additional lines provide control information; the path width signal on bus 79, as described above, and the resynchronization signal on line 89. The resynchronization signal instructs the control logic 52 to resynchronize its selector control signals on lines $64_1$, $64_2$, $64_3$, $70_1$ and $70_2$ to the next comma detect signal on line 84.

Figure 6A:
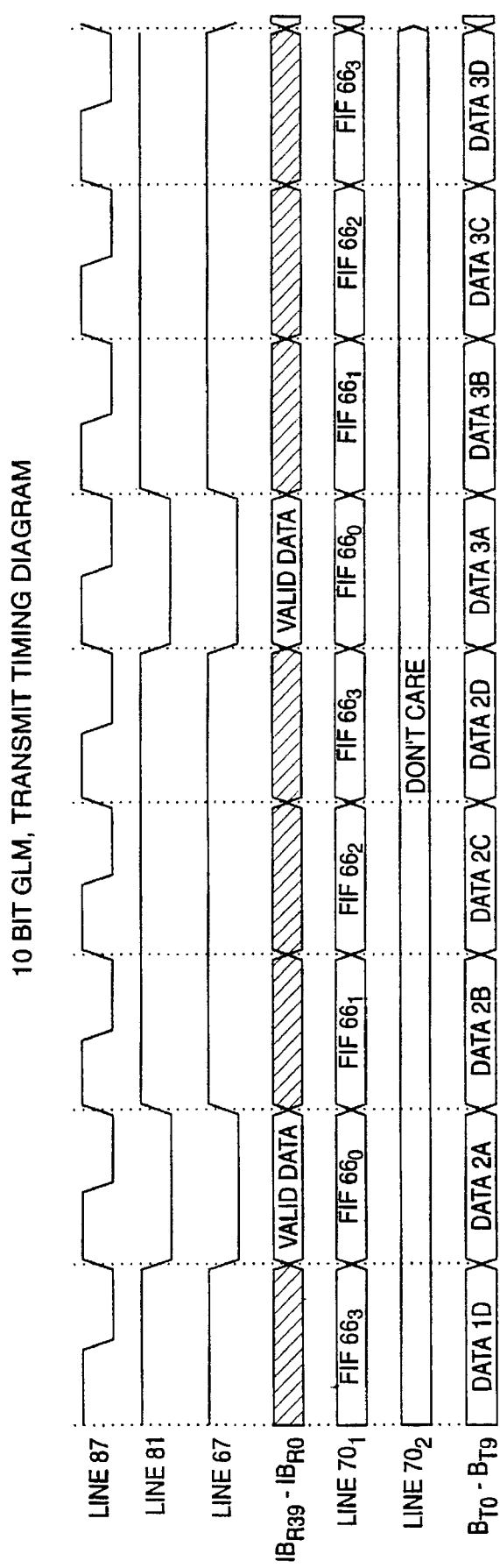
FIGS. 6A–6C are timing diagrams useful in understanding the transmit mode of the GLM, FIG. 6A being for a 10 bit data width GLM, FIG. 6B being for a 20 bit data width GLM, and FIG. 6C being for a 20 bit data width GLM.

Further, referring also to FIG. 6A, with a 10 bit data width GLM $40_1$, during the first of four clock cycles, data at ports $B_{R0}$–$B_{R39}$ are stored in flip-flop sections $66_0$–$66_3$; more particularly, the data at ports $B_{R0}$–$B_{R9}$ are stored in flip-flop section $66_0$, the data at ports $B_{R10}$–$B_{R19}$ are stored in flip-flop section $66_1$, the data at ports $B_{R20}$–$B_{R29}$ are stored in flip-flop section $66_2$, and the data at ports $B_{R30}$–$B_{R39}$ are stored in flip-flop section $66_3$. Also, during the first of the four clock cycles, the data stored in flip-flop section $66_0$ passes from the A input ports of selector $68_0$ to the output thereof in response to a control signal on lines $70_1$ and therefore appear at ports $B_{T0}$–$B_{T9}$. During the second of the four clock cycles, the data stored in flip-flop section $66_1$ passes from the B input ports of selector $68_1$ to the output thereof in response to a control signal on lines ports $70_1$ and therefore appear at ports $B_{T0}$–$B_{T9}$. During the third of the four clock cycles, the data stored in flip-flop section $66_2$ passes from the C input ports of selector $68_0$ to the output thereof in response to a control signal on lines $70_1$ and therefore appear at ports $B_{T0}$–$B_{T9}$. During the fourth of the four clock cycles, the data stored in flip-flop section $66_3$ passes from the D input ports of selector $68_0$ to the output thereof in response to a control signal on lines $70_1$ and therefore appear at ports $B_{T0}$–$B_{T9}$. A data valid signal is produced on transmit ready line 81 and a transmit byte clock signal on line 87 to indicate that the transit data is valid. It is noted that the buffer 48 couples the M=40 ports $IB_{R0}$–$IB_{R39}$ to $P_{T0}$–$P_{T9}$ of the GLM $40_1$ in a ratio of [M/P]=4 sequences.

Figure 6B:
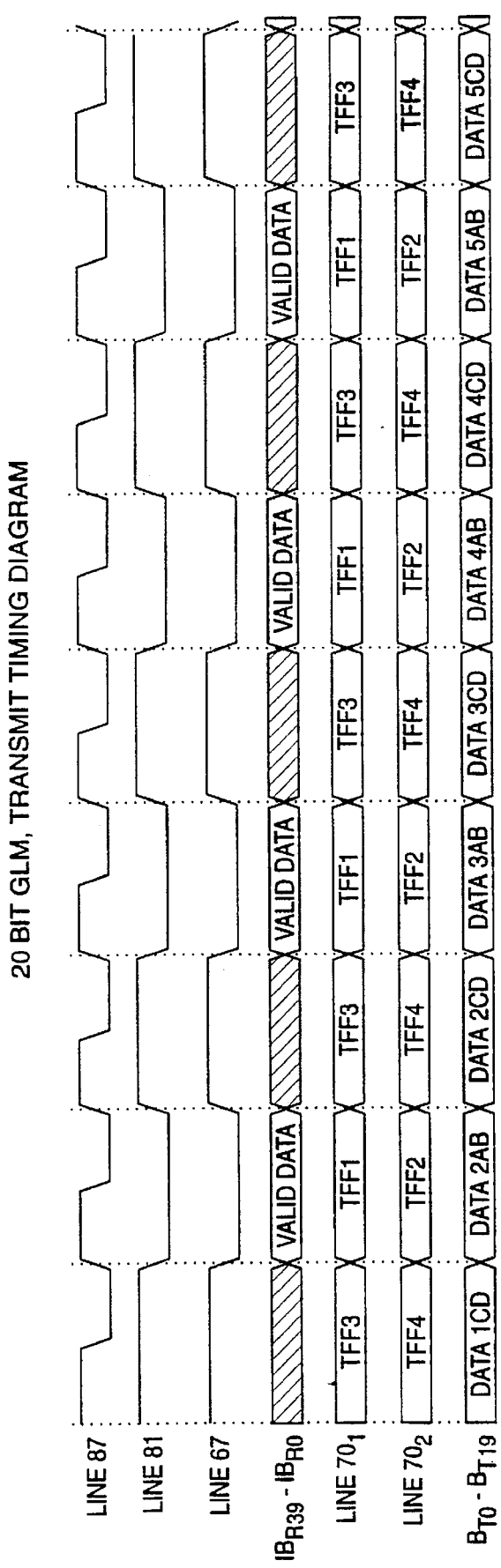

If GLM $4_{02}$ is detected (i.e., a 20 bit data width GLM having 20 transmit ports $P_T$ and 20 receive ports $P_R$), and referring to FIG. 6B, during a first of two clock cycles, the data at ports $P_{T0}$–$P_{T9}$ are stored in parallel into flip-flop section $62_0$. Data at ports $P_{T10}$–$P_{T19}$ pass from the B input of selector $60_2$ to the output thereof in response to a control signal on line $64_1$ and are stored in flip-flop section $62_1$. During the second of two clock cycles, the data at ports $P_{T0}$–$P_{T9}$ pass from port A of selector $60_2$ to the output therefore in response to a control signal on line $64_2$ and are stored in flip-flop section $62_2$. Data at ports $P_{T10}$–$P_{T19}$ pass from the B input of selector $60_3$ to the output thereof in response to a control signal on line $64_3$ and are stored in flip-flop section $62_3$. Thus, at the end of second of the four clock cycles, valid data appears at ports $B_{T0}$–$B_{T39}$ and a signal is produced on line 80. The GLM will provide a receive byte clock signal on line 83 to indicate that the receive data is valid and the GLM will produce a comma detect signal on line 85 to indicate that the special K 28.5 character has been received. It is noted that the buffer 48 couples the P=20 ports, $P_{T0}$–$P_{T19}$ of the GLM to the M=40 ports, $IB_{T0}$–$IB_{T39}$, of the buffer 48 in a ratio of [M/P]=2 sequences.

Further, with a GLM $40_2$, during the first of two clock cycles, data at ports $B_{R0}$–$B_{R39}$ are stored in flip-flop sections $66_0$–$66_3$. More particularly, the data at ports $B_{R0}$–$B_{R9}$ are stored in flip-flop section $66_0$, the data at ports $B_{R10}$–$B_{R19}$ are stored in flip-flop section $66_1$, the data at ports $B_{R20}-B_{R29}$ are stored in flip-flop section $66_2$, and the data at ports $B_{R30}-B_{R39}$ are stored in flip-flop section $66_3$. Also, during the first of the two clock cycles, the data stored in flip-flop section $66_0$ passes from the A input ports of selector $68_0$ to the output thereof in response to a control signal on lines ports $70_1$ and therefore appear at ports $B_{T0}-B_{T9}$. The data stored in flip-flop section $66_1$ passes from the A input ports of selector $68_1$ to the output thereof in response to a control signal on lines ports $70_2$ and therefore appear at ports $B_{T10}-B_{T19}$. During the second of the two clock cycles, the data stored in flip-flop section $66_3$ passes from the C input ports of selector $68_0$ to the output thereof in response to a control signal on lines ports $70_1$ and therefore appear at ports $B_{T0}-B_{T9}$. During the second of the two clock cycles, the data stored in flip-flop section $66_1$ passes from the A input ports of selector $68_1$ to the output thereof in response to a control signal on line $70_2$ and therefore appear at ports $B_{T10}-BT_{19}$. A signal is produced on line 81 and a transmit byte clock signal is produced on line 87 to indicate that the transit data is valid. It is noted that the buffer 48 couples the M=40 ports $IB_{R0}-IB_{R39}$ to $P_{T0}-P_{T19}$ of the GLM $40_2$ in a ratio of [M/P]=2 sequences.

Figure 6C:
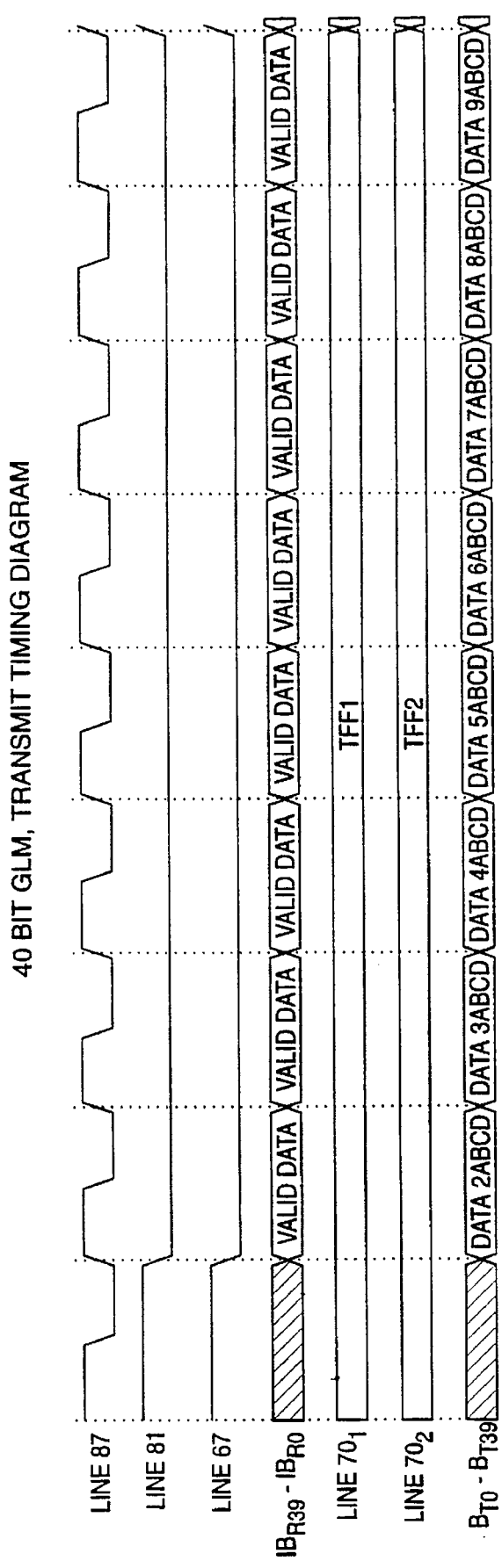

If GLM $40_3$ is detected (i.e., a 40 bit data width GLM having 40 transmit ports $P_T$ and 40 receive ports $P_R$), and referring to FIG. 6C, during each clock cycle, the data at ports $P_{T0}-P_{T9}$ are stored in parallel into flip-flop section $62_0$, the data at ports $P_{T10}-P_{T19}$ pass from the B input of selector $60_1$ to the output thereof in response to a control signal on line $64_1$ and are stored in flip-flop section $62_1$, the data at ports $P_{T20}-P_{T29}$ pass through the B input ports of selector $60_2$ in response to the control signal on line $64_2$ and are stored in parallel into flip-flop section $62_2$, and the data at ports $P_{T30}-P_{T39}$ pass from the C inputs of selector $60_3$ to the output thereof in response to the control signal on lines $64_3$ and are stored in parallel in flip-flop section $62_3$. Thus, at the end of each clock cycle, valid data appears at ports $B_{T0}-B_{T39}$ and a signal is produced on line 80. The GLM will provide a receive byte clock signal on line 83 to indicate that the receive data is valid and the GLM will produce a comma detect signal on line 85 to indicate that the special K 28.5 character has been received. It is noted that the buffer 48 couples the P=40 ports, $P_{T0}-P_{T39}$ of the GLM to the M=40 ports, $IB_{T0}-IB_{T39}$, of the buffer 48 in a ratio of [M/P]=1 sequence.

Further, with a GLM $4_{O3}$, during each clock cycle, data at ports $B_{R0}-B_{R39}$ are stored in flip-flop sections $66_0-66_3$. More particularly, the data at ports $B_{R0}-B_{R9}$ are stored in flip-flop section $66_0$, the data at ports $B_{R10}-B_{R19}$ are stored in flip-flop section $66_1$, the data at ports $B_{R20}$ $B_{R29}$ are stored in flip-flop section $66_2$, and the data at ports $B_{R30}-B_{R39}$ are stored in flip-flop section $66_3$. Also, during each clock cycle, the data stored in flip-flop section $66_0$ passes from the A input ports of selector $68_0$ to the output thereof in response to a control signal on lines $70_1$ and therefore appear at ports $B_{T0}-B_{T9}$. The data stored in flip-flop section $66_1$ passes from the A input ports of selector $68_1$ to the output thereof in response to a control signal on lines $70_2$ and therefore appear at ports $B_{T10}-B_{T19}$. The data stored in flip-flop sections $66_2$ and $66_3$ pass to ports $B_{T20}-B_{T39}$, a signal is produced on line 81, and a transmit byte clock signal is produced on line 87 to indicate that the transit data is valid. It is noted that the buffer 48 couples the M=40 ports $IB_{R0}-IB_{R39}$ to $P_{T0}-P_{T19}$ of the GLM $40_2$ in a ratio of [M/P]=1 sequence.

Other embodiments are within the spirit and scope of the appended claims.

What is claimed is:

1. A buffer system comprising:
   a buffer having a predetermined number, M, of input ports adapted for connection to one of a plurality of devices, such devices having different numbers, P, of ports, where P is less than, or equal to, M;
   circuitry for determining the number of ports, P, of the one of the plurality of devices connected to the M ports of the buffer;
   such buffer coupling the P ports of the one of the plurality of connected devices to the M output ports of the buffer in a ratio of (M/P) sequences.

2. The buffer system recited in claim 1 wherein each one of the devices is adapted to be placed in a loopback mode, such loopback mode coupling input ports of the device to output ports of the device and wherein the circuitry places a predetermined pattern of data at input ports of the device connected to the buffer and determines a pattern of data at the output ports of the device when such device is placed in the loopback mode.

3. A buffer system comprising:
   a buffer having a predetermined number, M, of ports adapted for connection to one of a plurality of devices, such devices having different numbers, P, of ports, where P is in a range from a minimum number of N ports to a maximum number of M ports;
   circuitry for determining the number of ports, P, of the one of the plurality of devices connected to the M ports of the buffer;
   such buffer having (M/N) storage buffers, for coupling the P ports of the one of the plurality of devices connected to the M ports of the buffer to the storage buffers in a ratio of (M/P) sequences, such P ports being coupled to a different one of the (M/N) storage buffers in each one the (M/P) sequences.

4. The buffer system recited in claim 3 including selectors coupled between the buffers and the ports of such buffer.

5. The buffer system recited in claim 3 wherein each one of the devices is adapted to be placed in a loopback mode, such loopback mode coupling input ports of the device to output ports of the device and wherein the circuitry places a predetermined pattern of data at input ports of the device and determines a pattern of data at the output ports of the device when such device is placed in the loopback mode.

6. A buffer system comprising:
   a buffer having a predetermined number, M, of input ports adapted for connection to one of a plurality of serial data/parallel data converters, such converters having different numbers, P, of ports, where P is less than, or equal to, M;
   circuitry for determining the number of ports, P, of the one of the plurality of connected converters connected to the M ports of the buffer;
   such buffer coupling the P ports of the one of the plurality of converters to M output ports of the buffer in a ratio of (M/P) sequences.

7. The buffer system recited in claim 6 wherein each one of the converters is adapted to be placed in a loopback mode, such mode coupling input ports of the converters to output ports of the converter and wherein the circuitry places a predetermined pattern of data at input ports of the device and determines a pattern of data at the output ports of the converter when such converter is placed in the loopback mode.

8. A buffer system comprising:
   a buffer having a predetermined number, M, of input ports adapted for connection to one of a plurality of serial data/parallel data converters, such converters having different numbers, P, of ports, where P is less than, or equal to, M;

circuitry for determining the number of ports, P, of the one of the plurality of converters connected to the M ports of the buffer;

such buffer coupling the P ports of the one of the plurality of serial data/parallel data converters to M output ports of the buffer in a ratio of (M/P) sequences.

9. The buffer system recited in claim 8 wherein each one of the converters is adapted to be placed in a loopback mode, such mode coupling input ports of the converters to output ports of the converter and wherein the circuitry places a predetermined pattern of data at input ports of the device and determines a pattern of data at the output ports of the converter when such converter is placed in the loopback mode.

10. A method for determining the number, P, of transmit/receive ports of one of a plurality of devices, such devices having different numbers of transmit ports and receive ports, each one of the devices being adapted for connection to a buffer, such buffer having a predetermined number, M, of input ports and output ports, where P is equal to or less than M, the receive ports of the device being adapted for connection to the output ports of the buffer and the transmit ports of the device being adapted for connection to the input ports of the buffer, each one of such devices being adapted to couple the transmit ports to the receive ports thereof when such device is placed in a loopback mode, comprising the steps of:

connecting one of the plurality of devices to the buffer;

placing a predetermined pattern of data on each of the output ports when the connected device is in the loopback mode;

detecting the pattern of data at the input ports in response to the predetermined data placed on the output ports; and, comparing the predetermined pattern on the output ports with the detected pattern to determine the number of ports, P, of the connected one of the devices.

\* \* \* \* \*